United States Patent
Wu et al.

(10) Patent No.: US 11,136,424 B2
(45) Date of Patent: Oct. 5, 2021

(54) PREPARATION METHOD FOR FLUORINE- AND CHLORINE-CONTAINING CONDUCTIVE POLYMER RESIN AND SINGLE- OR DOUBLE-SIDED FILLED COMPOSITE THIN FILM PREPARED USING SAME AND THE PREPARATION METHOD THEREFOR

(71) Applicant: Zhejiang Hyproof Technology Co., Ltd., Zhejiang (CN)

(72) Inventors: Huisheng Wu, Zhejiang (CN); Ying Yang, Zhejiang (CN)

(73) Assignee: Zhejiang Hyproof Technology Co., Ltd., Zhejiang (CN)

( * ) Notice: Subject to any disclaimer, the term of this patent is extended or adjusted under 35 U.S.C. 154(b) by 85 days.

(21) Appl. No.: 16/605,668

(22) PCT Filed: Apr. 4, 2018

(86) PCT No.: PCT/CN2018/081864
§ 371 (c)(1),
(2) Date: Nov. 19, 2019

(87) PCT Pub. No.: WO2018/192368
PCT Pub. Date: Oct. 25, 2018

(65) Prior Publication Data
US 2020/0131290 A1    Apr. 30, 2020

(30) Foreign Application Priority Data

Apr. 18, 2017 (CN) .......................... 201710251598.5
Apr. 18, 2017 (CN) .......................... 201710251601.3
Apr. 18, 2017 (CN) .......................... 201710251603.2

(51) Int. Cl.
C08J 5/18       (2006.01)
C08F 216/14     (2006.01)
C08J 9/42       (2006.01)
D01D 5/00       (2006.01)
D01D 5/08       (2006.01)

(52) U.S. Cl.
CPC .......... C08F 216/1475 (2020.02); C08J 5/18 (2013.01); C08J 9/42 (2013.01); D01D 5/0023 (2013.01); D01D 5/08 (2013.01); C08J 2327/12 (2013.01); C08J 2429/10 (2013.01)

(58) Field of Classification Search
CPC .......... B32B 2250/20; B32B 2260/021; B32B 2260/046; B32B 2262/0238; B32B 2262/0246; B32B 2262/0253; B32B 2262/0261; B32B 2262/0269; B32B 2262/0284; B32B 2262/106; B32B 2264/105; B32B 2264/108; B32B 2307/202; B32B 2307/54; B32B 2307/548; B32B 2307/714; B32B 2307/718; B32B 2307/724; B32B 2307/7265; B32B 2307/732; B32B 2457/18; B32B 3/26; B32B 5/26; B32B 7/12; C08F 214/222; C08F 214/242; C08F 214/262; C08F 216/1475; C08F 261/06; C08J 2327/12; C08J 2429/10; C08J 5/18; C08J 9/42; C09D 127/00; D01D 5/0023; D01D 5/003; D01D 5/06; D01D 5/08; D01D 5/18; D01F 6/32; D01F 6/38; D01F 9/22; D06M 17/10

See application file for complete search history.

(56) References Cited

U.S. PATENT DOCUMENTS

| | | | |
|---|---|---|---|
| 5,082,472 A | 1/1992 | Mallouk et al. | |
| 6,228,963 B1 | 5/2001 | Wheland et al. | |
| 6,706,803 B1 * | 3/2004 | Abusleme | C08F 14/24 524/457 |

(Continued)

FOREIGN PATENT DOCUMENTS

| | | |
|---|---|---|
| CN | 101003588 A | 7/2007 |
| CN | 101692496 A | 4/2010 |

(Continued)

OTHER PUBLICATIONS

International Search Report issued in corresponding International Patent Application No. PCT/CN2018/081864 dated Jun. 29, 2018.

*Primary Examiner* — Mark Kopec
*Assistant Examiner* — Jaison P Thomas
(74) *Attorney, Agent, or Firm* — Morgan, Lewis & Bockius LLP

(57) ABSTRACT

Disclosed are a method for a preparing fluorine- and chlorine-containing conductive polymer resin, a single-side or double-side filled composite film prepared using the fluorine- and chlorine-containing conductive polymer resin, and a method for preparing the film. The fluorine- and chlorine-containing conductive polymer single-side or double-side filled composite film comprises a microporous film skeleton and the fluorine- and a chlorine-containing conductive polymer resin. The composite film is mechanically stronger, more waterproof, more impervious to water and toxic and harmful chemicals, and more moisture permeability. When applied to biochemical protective clothing, it can greatly enhance the combat effectiveness of the soldiers because it is light and more impervious to water and toxic and harmful chemicals, brings about comfort, and keeps the soldiers warm. When applied to fuel cells, it can provide better electrical properties due to its high conductivity and can allow the fuel, such as hydrogen or alcohol, to burn more completely.

23 Claims, No Drawings

(56) References Cited

U.S. PATENT DOCUMENTS

| | | | |
|---|---|---|---|
| 2002/0144899 A1* | 10/2002 | Arcella | H01M 8/1067 |
| | | | 204/296 |
| 2003/0013816 A1* | 1/2003 | Bekiarian | H01M 8/1023 |
| | | | 525/326.2 |
| 2003/0148158 A1 | 8/2003 | Ameduri et al. | |
| 2005/0228127 A1* | 10/2005 | Tatemoto | H01M 8/1039 |
| | | | 524/805 |
| 2006/0223894 A1* | 10/2006 | Ghielmi | C08J 5/2237 |
| | | | 521/27 |
| 2007/0281199 A1* | 12/2007 | Lousenberg | H01M 8/1088 |
| | | | 429/483 |
| 2009/0053576 A1* | 2/2009 | Wu | H01M 8/1039 |
| | | | 429/494 |
| 2012/0202946 A1* | 8/2012 | Veneroni | C08F 14/18 |
| | | | 524/805 |
| 2015/0025293 A1 | 1/2015 | Feiring et al. | |
| 2015/0218084 A1 | 8/2015 | Merlo et al. | |

FOREIGN PATENT DOCUMENTS

| | | |
|---|---|---|
| CN | 101709102 A | 5/2010 |
| CN | 101764232 A | 6/2010 |
| CN | 101798365 A | 8/2010 |
| CN | 102633688 A | 8/2012 |
| CN | 103087251 A | 5/2013 |
| CN | 103204961 A | 7/2013 |
| CN | 103483748 B | 10/2015 |
| CN | 105111351 A | 12/2015 |
| CN | 106366230 A | 2/2017 |
| CN | 106947027 A | 7/2017 |
| CN | 106968110 A | 7/2017 |
| CN | 106977640 A | 7/2017 |
| WO | 2014/023611 A1 | 2/2014 |

* cited by examiner

PREPARATION METHOD FOR FLUORINE- AND CHLORINE-CONTAINING CONDUCTIVE POLYMER RESIN AND SINGLE- OR DOUBLE-SIDED FILLED COMPOSITE THIN FILM PREPARED USING SAME AND THE PREPARATION METHOD THEREFOR

This application is a U.S. national stage application of the PCT International Application No. PCT/CN2018/081864 filed on Apr. 4, 2018, which claims the benefit of foreign priority of Chinese patent application No. 201710251598.5, 201710251603.2 and 201710251601.3 filed on Apr. 18, 2017, the contents all of which are incorporated herein by reference.

BACKGROUND

The present disclosure relates to a method for a preparing fluorine- and chlorine-containing conductive polymer resin, a single-side or double-side filled composite film prepared using the fluorine- and chlorine-containing conductive polymer resin, and a method for preparing the film, pertaining to the technical field of polymer materials.

TECHNICAL FIELD

Fluorine-containing polymers, especially tetrafluoroethylene-based homopolymerized, modified, or copolymerized polymers, are excellent in physical and mechanical properties and in chemical stability, and they are being widely employed in various applications such as chemical materials, mechanics, electronics, aerospace, military protection, new materials and new energy. Chlorine-containing polymers, such as chlorotrifluoroethylene-based homopolymerized, modified, or copolymerized polymers, are excellent in physical and mechanical properties and in chemical impermeability, and they have been making important contributions to chemical protection.

Fluorine-containing conductive polymers, such as DuPont's Nafion resins, have excellent electrical conductivity and chemical stability, so they are being widely used in fuel cells and chlor-alkali membrane cells, but they are still disadvantageous in, for example, that their conductivity is not high enough, with single-film conductivity being less than 0.1 S/cm at room temperature, and their chemical imperviousness is not sufficient to effectively block toxic and hazardous chemicals.

The expanded polytetrafluoroethylene is prepared from polytetrafluoroethylene dispersion resin of high crystallinity by biaxial stretching and expansion. It has a microporous structure in which micro- or nano-fibers are closely combined, and is excellent in physical and chemical properties, mechanical properties, waterproofness, gas permeability and chemical stability. Since the 1970s, it has been used in the manufacturing of wire and cable insulations, artificial blood vessels, sealing tapes, environmentally friendly filtration materials and clothing fabrics. Patent document CN103483748B discloses a special fluorine-containing dispersion resin mixture, a microporous film prepared from it, and preparation methods thereof. The film is prepared by: blending a tetrafluoroethylene homopolymer emulsion dispersion with a fluorine-containing hot meltable, processable emulsion dispersion to give a special fluorine-containing dispersion resin mixture; blending the resin mixture with a lubricating oil; subjecting the mixture to extruding and stretching. The resultant fluorine-containing microporous film has high mechanical strength and excellent gas permeability, but its water pressure resistance and imperviousness to toxic and harmful chemicals are yet to be improved. Additionally, these micro- or nano-fibers, obtained by the process of stretching and expansion, are inferior in puncture resistance and creep resistance and prone to further stretch and become loose under tension. Consequently, the film deforms, does not function well, and cannot perform the protective function as normal.

SUMMARY

In order to overcome the disadvantages and shortcomings of the prior art stated as above, the present disclosure provides a method for preparing a fluorine- and chlorine-containing conductive polymer resin. It further provides a single-side or double-side filled composite film prepared using a fluorine- and chlorine-containing conductive polymer. The film has high mechanical strength and is excellent in physical and chemical properties such as waterproofness, moisture vapor transmission rate, washability, imperviousness to poisonous and harmful chemicals, and electrical conductivity.

The present disclosure provides a method for preparing a fluorine- and chlorine-containing conductive polymer resin, the method comprising:

Step S1 of adding, to a reaction vessel, 1%-20% by weight of a fluorine-containing sulfonyl fluoride liquid phase monomer which is capable of free radical polymerization, 79%-98% by weight of purified water, and 0.01%-1% by weight of a fluorine-containing surfactant, and stirring the mixture at a high speed to give a prepolymer emulsion.

Step S2 of introducing, into the reaction vessel, a gaseous monomer mixture of one or both of tetrafluoroethylene and vinylidene fluoride and chlorotrifluoroethylene under a reaction pressure of 5 kg or more, introducing a radical initiator, and allowing the reaction to proceed at a temperature of 20-120° C., under a reaction pressure of 5-25 kg, for 15-180 min to give the reaction product which is an emulsion of a fluorine- and chlorine-containing sulfonyl fluoride polymer. The fluorine-containing sulfonyl fluoride liquid phase monomer and the gaseous monomer mixture that actually participate in the radical polymerization are at a ratio ranging from 1:3 to 3:1 by weight, and the radical initiator added to the reaction vessel and the fluorine-containing sulfonyl fluoride liquid phase monomer are at a ratio ranging from 0.01% to 3.0% by weight.

Step S3 of hydrolyzing the emulsion of the fluorine- and chlorine-containing sulfonyl fluoride polymer, and then condensing, washing and drying the hydrolysate to give a fluorine- and chlorine-containing conductive polymer resin.

In step S1, the fluorine-containing sulfonyl fluoride liquid phase monomer includes one or more of $CF_2=CF-O-R_f-SO_2F$, $CF_2=CF-O-R_{f1}-O-R_{f2}-SO_2F$ and $CF_2=CF-CF_2-O-R_{f3}-SO_2F$, wherein $R_f$, $R_{f1}$ and $R_{f2}$ are fluorine-containing alkyl groups having 1 to 6 carbon atoms, and $R_{f3}$ is a fluorine-containing alkyl group having 0 to 5 carbon atoms. Preferably, the fluorine-containing sulfonyl fluoride liquid phase monomer includes one or more of $CF_2=CF-O-CF_2CF_2-SO_2F$, $CF_2=CF-O-CF_2CF(CF_3)-O-CF_2CF_2-SO_2F$, $CF_2=CF-CF_2-O-SO_2F$ and $CF_2=CF-CF_2-O-CF_2CF_2-SO_2F$.

In the method for preparing a fluorine- and chlorine-containing conductive polymer resin according to the present disclosure, when the fluorine- and chlorine-containing conductive polymer resin applies to batteries, the fluorine-containing sulfonyl fluoride liquid phase monomer consists of 0%-80% by weight of $CF_2=CF-O-CF_2CF_2-SO_2F$, 20%-99% by weight of $CF_2=CF-O-CF_2CF(CF_3)-O-CF_2CF_2-SO_2F$, 0%-20% by weight of $CF_2=CF-CF_2-O-SO_2F$, and 0%-80% by weight of $CF_2=CF-CF_2-O-CF_2CF_2-SO_2F$.

In the method for preparing a fluorine- and chlorine-containing conductive polymer resin according to the present disclosure, when the fluorine- and chlorine-containing conductive polymer resin applies to nuclear and biochemical protective films, the fluorine-containing sulfonyl fluoride liquid phase monomer consists of 0%-80% by weight of $CF_2=CF-O-CF_2CF_2-SO_2F$, 0%-20% by weight of $CF_2=CF-O-CF_2CF(CF_3)-O-CF_2CF_2-SO_2F$, 20%-100% by weight of $CF_2=CF-CF_2-O-SO_2F$, and 0%-80% by weight of $CF_2=CF-CF_2-O-CF_2CF_2-SO_2F$.

In the method for preparing a fluorine- and chlorine-containing conductive polymer resin according to the present disclosure, the fluorine-containing sulfonyl fluoride monomer contains a fluorine-containing sulfonyl fluoride-free reagent, the ratio of the weight of which to the weight of the fluorine-containing sulfonyl fluoride monomer is less than or equal to 30%.

In the method for preparing a fluorine- and chlorine-containing conductive polymer resin according to the present disclosure, the fluorine-containing sulfonyl fluoride-free reagent includes one or more of a fluorine-containing alkyl group, a fluorine-containing alkyl ether, perfluoromethyl vinyl ether, perfluoroethyl vinyl ether, perfluoropropyl vinyl ether, 3,3,3-trifluoropropene, and perfluoroalkylethylene.

In the method for preparing a fluorine- and chlorine-containing conductive polymer resin according to the present disclosure, the gaseous monomer mixture comprises 25%-90% by mol of tetrafluoroethylene, 0%-70% by mol of vinylidene fluoride, and 5%-50% by mol of chlorotrifluoroethylene.

In the method for preparing a fluorine- and chlorine-containing conductive polymer resin according to the present disclosure, the fluorine-containing surfactant includes an organic substance having 6 to 16 carbon atoms and having at least one carboxylic acid or sulfonic acid functional group.

In the method for preparing a fluorine- and chlorine-containing conductive polymer resin according to the present disclosure, the radical initiator includes one or more of a persulfate, hydrogen peroxide, and an organic peroxide.

Further, the present disclosure provides a fluorine- and chlorine-containing conductive polymer single-side filled composite film, comprising a microporous film skeleton and the fluorine- and chlorine-containing conductive polymer resin according to the present disclosure, wherein more than 85% by volume of the pores in a single side of the microporous film skeleton are filled with the fluorine- and chlorine-containing conductive polymer resin.

The present disclosure provides a method for preparing a fluorine- and chlorine-containing conductive polymer single-side filled composite film, comprising:
filling the pores in a single side of a microporous film skeleton with the fluorine- and chlorine-containing conductive polymer resin in a coating or immersing way to give a composite material; and drying the composite material.

In the method for preparing a fluorine- and chlorine-containing conductive polymer single-side filled composite film according to the present disclosure, the ratio of the weight of the microporous film skeleton to the weight of the fluorine- and chlorine-containing conductive polymer resin ranges from 25:75 to 75:25.

In the method for preparing a fluorine- and chlorine-containing conductive polymer single-side filled composite film according to the present disclosure, the microporous film skeleton is prepared by
subjecting, to melt spinning or wet spinning, one of a hot meltable fluorine-containing, or fluorine- and chlorine-containing resin, the fluorine- and chlorine-containing conductive polymer resin, a carbon fiber precursor, polyimide, polyamide, polyester, aramid, and polyetherketone, collecting an irregular net of microporous structures, and subjecting the net to heat setting.

In the method for preparing a fluorine- and chlorine-containing conductive polymer single-side filled composite film according to the present disclosure, the pores in a single side of the microporous film skeleton are filled with the fluorine- and chlorine-containing conductive polymer resin and one or more of activated charcoal powder, graphite powder, graphene, and rare metal powder. Preferably, the weight of one or more of activated charcoal powder, graphite powder, graphene, and rare metal powder does not exceed 25% of the weight of the fluorine- and chlorine-containing conductive polymer resin.

In the method for preparing a fluorine- and chlorine-containing conductive polymer single-side filled composite film according to the present disclosure, the rare metal powder is silver, platinum or palladium.

In the method for preparing a fluorine- and chlorine-containing conductive polymer single-side filled composite film according to the present disclosure, the hot meltable fluorine-containing, or fluorine- and chlorine-containing resin includes one or more of hot meltable polytetrafluoroethylene copolymer, polychlorotrifluoroethylene or copolymer thereof, and polyvinylidene fluoride or copolymer thereof.

In the method for preparing a fluorine- and chlorine-containing conductive polymer single-side filled composite film according to the present disclosure, an acid including sulfonic acid or carboxylic acid equivalent weight (meq/g) of the fluorine- and chlorine-containing conductive polymer resin ranges from 400 to 1,600.

In the method for preparing a fluorine- and chlorine-containing conductive polymer single-side filled composite film according to the present disclosure, the spinning is carried out using a wet phase change method, a temperature difference phase change method, a dry solvent method, an electrospinning method or an ultra-high speed centrifugal spinning method.

The present disclosure further provides a fluorine- and chlorine-containing conductive polymer double-side filled composite film, comprising a microporous film skeleton and the fluorine- and chlorine-containing conductive polymer resin according to the present disclosure, wherein more than 60% by volume of the pores in two sides of the microporous film skeleton are filled with the fluorine- and chlorine-containing conductive polymer resin.

The present disclosure provides a method for preparing a fluorine- and chlorine-containing conductive polymer double-side filled composite film, comprising:
filling the pores in two sides of a microporous film skeleton with the fluorine- and chlorine-containing conductive polymer resin in a coating or immersing way to give a composite material, and drying the composite material.

In the method for preparing a fluorine- and chlorine-containing conductive polymer double-side filled composite film according to the present disclosure, the ratio of the weight of the microporous film skeleton to the weight of the fluorine- and chlorine-containing conductive polymer resin ranges from 5:95 to 40:60.

In the method for preparing a fluorine- and chlorine-containing conductive polymer double-side filled composite film according to the present disclosure, the microporous film skeleton is prepared by subjecting, to melt spinning or wet spinning, one of a hot meltable fluorine-containing, or fluorine- and chlorine-containing resin, the fluorine- and chlorine-containing conductive polymer resin, a carbon fiber precursor, polyimide, polyamide, polyester, aramid, and polyetherketone, collecting an irregular net of microporous structures, and subjecting the net to heat setting.

In the method for preparing a fluorine- and chlorine-containing conductive polymer double-side filled composite film according to the present disclosure, the pores in two sides of the microporous film skeleton are filled with the fluorine- and chlorine-containing conductive polymer resin and one or more of activated charcoal powder, graphite powder, graphene, and rare metal powder. Preferably, the weight of one or more of activated charcoal powder, graphite powder, graphene, and rare metal powder does not exceed 25% of the weight of the fluorine- and chlorine-containing conductive polymer resin.

In the method for preparing a fluorine- and chlorine-containing conductive polymer double-side filled composite film according to the present disclosure, the rare metal powder is silver, platinum or palladium.

In the method for preparing a fluorine- and chlorine-containing conductive polymer double-side filled composite film according to the present disclosure, the hot meltable fluorine-containing, or fluorine- and chlorine-containing resin includes one or more of hot meltable polytetrafluoroethylene copolymer, polychlorotrifluoroethylene or copolymer thereof, and polyvinylidene fluoride or copolymer thereof.

In the method for preparing a fluorine- and chlorine-containing conductive polymer double-side filled composite film according to the present disclosure, an acid equivalent weight (meq/g) of the fluorine- and chlorine-containing conductive polymer resin ranges from 400 to 1,500.

In the method for preparing a fluorine- and chlorine-containing conductive polymer double-side filled composite film according to the present disclosure, the spinning is carried out using a wet phase change method, a temperature difference phase change method, a dry solvent method, an electrospinning method or an ultra-high speed centrifugal spinning method.

The method for preparing a fluorine- and chlorine-containing conductive polymer resin according to the present disclosure gives a fluorine- and chlorine-containing conductive polymer resin which, compared with a perfluoropolymer, is mechanically stronger, more creep resistant, and less prone to deform due to an increase in intermolecular attraction which comes from a small number of chlorine atoms on the polymer main chain. It is also useful as a protective clothing film because it is more impervious to toxic and harmful chemical substances, and can be used as the membrane of alcohol fuel cells because it is more impermeable to alcohol.

The fluorine- and chlorine-containing conductive polymer single-side or double-side filled composite film according to the present disclosure is mechanically stronger, more waterproof, more impervious to water and toxic and harmful chemicals, and more moisture permeability. When applied to biochemical protective clothing, it can greatly enhance the combat effectiveness of the soldiers because it is light and more impervious to water and toxic and harmful chemicals, brings about comfort, and keeps the soldiers warm. When applied to fuel cells, it can provide better electrical properties due to its high conductivity and can allow the fuel, such as hydrogen or alcohol, to burn more completely.

DETAILED DESCRIPTION

The present disclosure will be described in more details. One thing worth noting is that the embodiments show how to carry out the present disclosure, but are not meant to limit it.

Definitions

The term "fluorine-containing sulfonyl fluoride liquid phase monomer" refers to a monomer which is to be added to a liquid phase, contains both a sulfonyl fluoride group and an additional fluorine-containing group. The term "fluorine- and chlorine-containing sulfonyl fluoride polymer" refers to a polymer which contains both a sulfonyl fluoride group and an additional fluorine-containing group and an additional chlorine-containing group.

The reaction pressure in the present disclosure is measured in kilograms, which is, strictly speaking, "kilogram force per square centimeter", i.e., 1 kilogram pressure is equal to 1 $kg/cm^2$.

The term "molecular weight" refers to the number average molecular weight ($M_n$). $M_n$ is defined as the number average molecular weight determined by light scattering (optionally, combined with size exclusion chromatography (SEC)).

<Method for Preparing Fluorine- and Chlorine-Containing Conductive Polymer Resin>

The present disclosure provides a method for preparing a fluorine- and chlorine-containing conductive polymer resin, the method comprising:

Step S1 of adding, to a reaction vessel, 1%-20% by weight of a fluorine-containing sulfonyl fluoride liquid phase monomer (which is capable of free radical polymerization), 79%-98% by weight of purified water, and 0.01%1% by weight of a fluorine-containing surfactant, and stirring the mixture at a high speed, for 20 min to 50 min, to give a prepolymer emulsion. In one embodiment of the present disclosure, the stirring continues for 30 min.

Step S2 of introducing, into the reaction vessel, a gaseous monomer mixture of one or both of tetrafluoroethylene and vinylidene fluoride and chlorotrifluoroethylene under a reaction pressure of 5 kg or more, introducing a radical initiator, and allowing the reaction to proceed at a temperature of 0-120° C., under a reaction pressure of 5-25 kg, for 15-180 min. The reaction product is an emulsion of a fluorine- and chlorine-containing sulfonyl fluoride polymer. In one embodiment of the present disclosure, the reaction proceeds at the temperature of 70° C. for 1 hr. The fluorine-containing sulfonyl fluoride liquid phase monomer and the gaseous monomer mixture that actually participate in the radical polymerization are at a ratio ranging from 1:3 to 3:1 by weight, preferably from 1:2.5 to 3:1 by weight, and the radical initiator added to the reaction vessel and the fluorine-containing sulfonyl fluoride liquid phase monomer are at a ratio ranging from 0.01% to 3.0% by weight, preferably 0.05% by weight.

Step S3 of hydrolyzing the emulsion of the fluorine- and chlorine-containing sulfonyl fluoride polymer, and then condensing, washing and drying the hydrolysate to give a fluorine- and chlorine-containing conductive polymer resin.

The specific preparation process described above modifies the fluoropolymer with a fluorine-containing sulfonyl fluoride liquid phase monomer and a chlorotrifluoroethylene monomer and thus improves the conductivity of the polymer. Besides, the modified polymer is mechanically stronger, more creep resistant, and more impervious to toxic and harmful chemicals because the introduction of a small number of chlorine atoms to the polymer main chain leads to an increase in intermolecular attraction.

In step S1, the fluorine-containing sulfonyl fluoride liquid phase monomer includes one or more of $CF_2=CF-O-R_f-SO_2F$, $CF_2=CF-O-R_{f1}-O-R_{f2}-SO_2F$ and $CF_2=CF-CF_2-O-R_{f3}-SO_2F$, wherein $R_f$, $R_{f1}$ and $R_{f2}$ are fluorine-containing alkyl groups having 1 to 6 carbon atoms, and $R_{f3}$ is a fluorine-containing alkyl group having 0 to 5 carbon atoms. Further, the fluorine-containing sulfonyl fluoride liquid phase monomer includes one or more of $CF_2=CF-O-CF_2CF_2-SO_2F$, $CF_2=CF-O-CF_2CF(CF_3)-O-CF_2CF_2-SO_2F$, $CF_2=CF-CF_2-O-SO_2F$ and $CF_2=CF-CF_2-O-CF_2CF_2-SO_2F$. The above monomers help to increase the ionic conductivity of the polymer. In one embodiment of the present disclosure, the fluorine-containing sulfonyl fluoride liquid phase monomer includes $CF_2=CF-O-CF_2CF_2-SO_2F$ and $CF_2=CF-O-CF_2CF(CF_3)-O-CF_2CF_2-SO_2F$. In another embodiment of the present disclosure, the fluorine-containing sulfonyl fluoride liquid phase monomer includes $CF_2=CF-O-CF_2-SO_2F$ and $CF_2=CF-O-CF_2CF_2-SO_2F$.

When the fluorine- and chlorine-containing conductive polymer resin applies to batteries, the fluorine-containing sulfonyl fluoride liquid phase monomer consists of 0%-80% by weight of $CF_2=CF-O-CF_2CF_2-SO_2F$, 20%-99% by weight of $CF_2=CF-O-CF_2CF(CF_3)-O-CF_2CF_2-SO_2F$, 0%-20% by weight of $CF_2=CF-CF_2-O-SO_2F$, and 0%-80% by weight of $CF_2=CF-CF_2-O-CF_2CF_2-SO_2F$. When the fluorine- and chlorine-containing conductive polymer resin applies to nuclear and biochemical protective films, the fluorine-containing sulfonyl fluoride liquid phase monomer consists of 0%-80% by weight of $CF_2=CF-O-CF_2CF_2-SO_2F$, 0%-20% by weight of $CF_2=CF-O-CF_2CF(CF_3)-O-CF_2CF_2-SO_2F$, 20%-100% by weight of $CF_2=CF-CF_2-O-SO_2F$, and 0%-80% by weight of $CF_2=CF-CF_2-O-CF_2CF_2-SO_2F$. Optionally, the fluorine-containing sulfonyl fluoride monomer contains a fluorine-containing sulfonyl fluoride-free reagent, the ratio of the weight of which to the weight of the fluorine-containing sulfonyl fluoride monomer is less than or equal to 30%, and may be 0% The fluorine-containing sulfonyl fluoride-free reagent plays the role of adjusting the stability and dielectric properties of the polymer. The fluorine-containing sulfonyl fluoride-free reagent includes one or more of a fluorine-containing alkyl group, a fluorine-containing alkyl ether, a perfluoroalkyl vinyl ether (e.g., perfluoromethyl vinyl ether, perfluoroethyl vinyl ether and perfluoropropyl vinyl ether), 3,3,3-trifluoropropene, and perfluoroalkylethylene.

The gaseous monomer mixture consists of 25%-90% by mol of tetrafluoroethylene (TFE: $CF_2=CF_2$), 0%-70% by mol of vinylidene fluoride (VdF: $CH_2=CF_2$), and 5%-50% of chlorotrifluoroethylene (CTFE: $CF_2=CFCl$). In one embodiment of the present disclosure, the gaseous monomer mixture does not comprise vinylidene fluoride. In another embodiment of the present disclosure, the amount of chlorotrifluoroethylene ranges from 5% to 30% by mol, and the small amount of chlorine helps to increase the mechanical strength of the polymer while keeping its chemical resistance.

A fluorine-containing surfactant may serve as an emulsifier in the present disclosure. In one embodiment of the present disclosure, the fluorine-containing surfactant is ammonium perfluorooctanoate. In this description, the fluorine-containing surfactant refers to a fluorine-containing compound which has at least one fluorine atom in its molecular structure and exhibits surface activity. An example of the fluorine-containing surfactant includes a surfactant composed of a hydrocarbon having 6 to 16 carbon atoms with at least one hydrogen atom substituted by a fluorine atom, and a hydrophilic group such as a carboxylic acid, a carboxylate, a sulfonic acid, and a sulfonic acid group. Industrially, the surfactant is, for example, ammonium perfluorooctanoate and sulfonium perfluorooctanoate.

The radical initiator includes one or more of a persulfate, hydrogen peroxide, and an organic peroxide. Examples of the persulfate include ammonium persulfate (APS) and potassium persulfate (KPS). Examples of the organic peroxide include disuccinic acid peroxide (DSP) and diglutaric acid peroxide. APS is more preferred if the decomposition temperature, processing simplicity, costs, and end groups of the polymer are taken into consideration.

The fluorine-containing chlorine-containing conductive polymer resin prepared using the method described above has an average particle diameter of about 40-200 nm for its primary particles. The solid content of the emulsion of the fluorine- and chlorine-containing sulfonyl fluoride polymer is about 18%-25% After being hydrolyzed using sulfonyl fluoride ($-SO_2F$), the emulsion produces a fluorine-, chlorine- and sulfonic acid ($-SO_3H$)-containing conductive polymer. After being dried, the polymer has a specific gravity of about 1.7 to 2.1 and an acid equivalent weight (meq/g) ranging from 300 to 1,700, preferably from 400 to 1,600.

<Method for Preparing Fluorine- and Chlorine-Containing Conductive Polymer Single-Side or Double-Side Filled Composite Film>

The present disclosure further provides a method for preparing a fluorine- and chlorine-containing conductive polymer single-side or double-side filled composite film.

The fluorine- and chlorine-containing conductive polymer single-side or double-side filled composite film is prepared by filling a microporous film skeleton with the fluorine- and chlorine-containing conductive polymer resin prepared using the method described above.

For the fluorine- and chlorine-containing conductive polymer single-side filled composite film according to the present disclosure, most (more than 85% by volume, preferably more than 95% by volume, more preferably more than 99% by volume) of the pores in a single side of the microporous film skeleton are filled with the fluorine- and chlorine-containing conductive polymer resin. For the fluorine- and chlorine-containing conductive polymer double-side filled composite film according to the present disclosure, more than 60% by volume (preferably more than 75% by volume, more preferably more than 90% by volume) of the pores in two sides of the microporous film skeleton are filled with the fluorine- and chlorine-containing conductive polymer resin.

The method for preparing a fluorine- and chlorine-containing conductive polymer single-side or double-side filled composite film according to the present disclosure comprises the following step:

Step I of preparing a microporous film skeleton. Specifically, first, the raw materials are spun using a wet phase change method, a temperature difference phase change method, a dry solvent method, an electrospinning method or an ultra-high speed centrifugal spinning method. The melt spinning or wet (solvent or water) spinning produces filaments having a diameter of about 50-1,000 nm. The filaments are uniformly collected into an irregular net of microporous structures. After being subjected to heat setting, the net becomes a microporous film. The microporous film skeleton weighs about 1-50 g/m$^2$, preferably 3-25 g/m$^2$, and has a porosity of about 50%-95%, preferably 70%-90%.

The material of the microporous film skeleton is selected from (I) a hot meltable fluorine-containing (chlorine-containing) resin selected from a hot meltable polytetrafluoroethylene copolymer, polychlorotrifluoroethylene or a copolymer thereof, and polyvinylidene fluoride or copolymer thereof; (II) a fluorine- and chlorine-containing conductive polymer resin (with an acid (sulfonic acid or carboxylic acid) equivalent weight (meq/g) ranging from 1,000 to 2,000, preferably from 1,200 to 1,600); (III) a carbon fiber precursor such as polyacrylonitrile and its copolymer or any other resin which can be derivatized into a carbon fiber; and (IV) any other advanced engineering material selected from polyimide, polyamide (nylon), polyethylene terephthalate (PET), aramid, polyether ether ketone (PEEK), etc. It is preferable that the microporous film prepared from the carbon fiber precursor can become carbon nanofiber microporous film after being subjected to high temperature pre-oxidation, graphitization, carbonization and the like.

Step II of filling the pores in a single side or two sides of the microporous film skeleton with the fluorine- and chlorine-containing conductive polymer resin. Specifically, the microporous film skeleton prepared in step I is filled, in a coating or immersing way, with the fluorine- and chlorine-containing conductive polymer resin according to the present disclosure and optionally, a small amount of activated charcoal powder, graphite powder, graphene, and rare metal powder to result in a composite material. The composite material is then dried to give the composite film. The weight of the optionally added activated charcoal powder, graphite powder, graphene, and rare metal powder is not more than 25%, preferably not more than 11%, of the weight of the fluorine- and chlorine-containing conductive polymer resin. The rare metal powder is selected from silver (Ag), platinum (Pt), and palladium (Pd).

The fluorine- and chlorine-containing conductive polymer resin used in the preparation of the fluorine- and chlorine-containing conductive polymer single-side filled composite film has an acid (sulfonic acid or carboxylic acid) equivalent weight (meq/g) that ranges from 400 to 1,600, preferably from 600 to 1,200, more preferably from 800 to 1,100, and has a single-film conductivity, at room temperature, of more than 0.05 S/cm, preferably more than 0.1 S/cm, more preferably more than 0.15 S/cm. Most (more than 85% by volume, preferably more than 95% by volume, more preferably more than 99% by volume) of the pores in the single side of the microporous film skeleton are filled with the fluorine- and chlorine-containing conductive polymer resin, or with the fluorine- and chlorine-containing conductive polymer resin and a small amount of activated charcoal powder, graphite powder, graphene, and rare metal powder. The fluorine- and chlorine-containing conductive polymer single-side filled composite film has low air permeability. The time required for 100 ml of air to pass through the composite film that is measured by a Gurley gas permeability meter is more than 3 min, preferably more than 10 min.

If no activated charcoal powder, graphite powder, graphene or rare metal powder is added in step II, the weight of the fluorine- and chlorine-containing conductive polymer single-side filled composite film is 10-200 g/m$^2$, preferably 20-100 g/m$^2$, more preferably 25-90 g/m$^2$, and its thickness is 1-100 microns, preferably 3-50 microns, more preferably 5-30 microns. On the other hand, if a small amount of activated charcoal powder, graphite powder, graphene or rare metal powder is added in step II, the weight of the fluorine- and chlorine-containing conductive polymer single-side filled composite film is 10-250 g/m$^2$, preferably 20-150 g/m$^2$, more preferably 25-100 g/m$^2$, and its thickness is 2-100 micrometers, preferably 3-50 micrometers, and more preferably 5-30 micrometers.

The fluorine- and chlorine-containing conductive polymer resin used in the preparation of the fluorine- and chlorine-containing conductive polymer double-side filled composite film has an acid (sulfonic acid or carboxylic acid) equivalent weight (meq/g) that ranges from 400 to 1,500, preferably from 500 to 1,100, more preferably from 600 to 950. The ratio of the weight of the microporous film skeleton to the weight of the fluorine- and chlorine-containing conductive polymer resin ranges from 5:95 to 40:60, preferably from 10:90 to 30:70. Most (more than 60% by volume, preferably more than 75% by volume, more preferably more than 90% by volume) of the pores in the two sides of the microporous film skeleton are filled with the fluorine- and chlorine-containing conductive polymer resin, or with the fluorine- and chlorine-containing conductive polymer resin and a small amount of activated charcoal powder, graphite powder, graphene, and rare metal powder. The fluorine- and chlorine-containing conductive polymer double-side filled composite film has low air permeability. The time required to for 100 ml of air to pass through the composite film that is measured by a Gurley gas permeability meter is more than 3 min, preferably more than 10 min. If no activated charcoal powder, graphite powder, graphene or rare metal powder is added in step II, the weight of the fluorine- and chlorine-containing conductive polymer double-side filled composite film is 5-200 g/m$^2$, preferably 10-100 g/m$^2$, more preferably 20-90 g/m$^2$, and its thickness is 3-100 microns, preferably 5-50 microns, more preferably 10-45 microns, and it has conductivity, at room temperature, of more than 0.10 S/cm, preferably more than 0.15 S/cm, more preferably more than 0.20 S/cm. On the other hand, if a small amount of activated charcoal powder, graphite powder, graphene or rare metal powder is added in step II, the weight of the fluorine- and chlorine-containing conductive polymer double-side filled composite film is 5-250 g/m$^2$, preferably 10-150 g/m$^2$, more preferably 20-100 g/m$^2$, and its thickness is 3-100 micrometers, preferably 5-50 micrometers, and more preferably 10-30 micrometers, and it has a conductivity, at room temperature, of more than 0.1 S/cm, preferably more than 0.15 S/cm, more preferably more than 0.20 S/cm.

The fluorine- and chlorine-containing conductive polymer single-side or double-side filled composite film according to the present disclosure is superior in mechanical strength to a film made solely from a fluorine- and chlorine-containing conductive polymer, and its high tensile strength ensures its applicability to proton exchange membrane fuel cells. If the composite film according to the present disclosure is compounded with a nylon 6 plain weave fabric, the obtained composite fabric has a water pressure resistance (detected by HS L1092 method) that is initially greater than 200 kPa, and is still greater than 100 kPa after being washed 10 times, and has moisture vapor transmission rate of more than 4,000 g/m$^2$/day. Tested in accordance with the US military regulations MIL-DTL-32102 3 Apr. 2002, the composite fabric allows the toxic gas of chloroethyl ether ($ClCH_2CH_2OCH_2CH_2Cl$) to pass through at a rate less than 4 μg/cm$^2$/day, which is the evidence that the composite film of the present disclosure is superior in impermeability to biochemical toxics and is thus usable in the preparation of nuclear and biochemical protective clothing.

EXAMPLES

The embodiments of the present disclosure will be described in detail below with reference to examples. However, the following examples are intended to illustrate the present disclosure and not intended to limit the scope thereof. Those conditions in the examples that are not described in detail are either conventional ones or those recommended by the manufacturers. Those of the reagents or instruments whose manufacturers are not indicated are conventional products that are commercially available.

The test methods and instruments used in the examples are as follows:

The test of porosity followed ASTM standard D6093.

The test of tensile strength used the tensile strength machine (Instron) and followed the test method ASTM-D882.

The test of water pressure resistance followed the JIS L1092 method.

The test of the moisture vapor transmission rate, also known as MVTR (expressed in g/m$^2$/day), followed JIS LI099 A1 with the outer layer facing up.

The gas permeability was measured using the Gurley method, in which the time required for 100 ml of air to pass through the sample was recorded, and the outer layer faced downward.

The impermeability to biochemical toxics was measured in accordance with the US military regulations MIL-DTL-32102 3 Apr. 2002, in which chloroethyl ether ($ClCH_2CH_2OCH_2CH_2Cl$) served as the toxic gas.

The test of conductivity was carried out at 25° C. using the Crison 525 conductivity meter.

The amount of the polymer filling the film skeleton was calculated by subtracting the unit weight of the skeleton from the unit weight of the composite film.

(1) PREPARATION OF FLUORINE- AND CHLORINE-CONTAINING POLYMER RESIN

Preparation Example 1

To a pre-emulsification reactor A of about 100 liters of internal volume, 39,000 g of purified water and 100 g of ammonium perfluorooctanoate were added at room temperature. As the mixture was being stirred at a high speed, 5,000 g of a fluorine-containing sulfonyl fluoride liquid phase monomer consisting of 70% by weight of $CF_2\!=\!CF\!-\!O\!-\!CF_2CF(CF_3)\!-\!O\!-\!CF_2CF_2\!-\!SO_2F$ and 30% by weight of $CF_2\!=\!CF\!-\!O\!-\!CF_2CF_2\!-\!SO_2F$ were added slowly. Continuing the high-speed shear stirring for about 30 min gave rise to a prepolymer emulsion.

Oxygen was removed from another reactor B of about 100 liters of internal volume to such an extent that the oxygen content in the reactor B is less than 20 ppm. Then, all the prepolymer emulsion from the reactor A and a gaseous monomer mixture consisting of 90% by mol of tetrafluoroethylene and 10% by mol of chlorotrifluoroethylene were added to the reactor B. In the reactor B, the temperature was raised to 70° C., and the pressure was maintained at 11 kg. At this time, a solution of 2.5 g of ammonium persulfate in 1 liter of deionized water was added to start free radical polymerization.

The fluorine-containing sulfonyl fluoride liquid phase monomer and the gaseous monomer mixture that actually participated in the radical polymerization were at the ratio about 4:5 by weight, and the radical initiator added to the reactor B and the fluorine-containing sulfonyl fluoride liquid phase monomer were at the ratio of 0.05% by weight.

The temperature of the reaction in the reactor B was controlled at 70° C. to 75° C., and the reaction continued for 1 hr. When the temperature in the reactor B was lowered to room temperature, the stirring was stopped. The resultant was an emulsion of a fluorine- and chlorine-containing conductive polymer of which the primary particles have the average particle diameter of about 100 nm and which has the solid content of about 19%. Hydrolyzing the emulsion with sulfonyl fluoride ($-SO_2F$) resulted in a fluorine- and chlorine-containing sulfonic acid ($-SO_3H$) conductive polymer. After being dried, the conductive polymer has the specific gravity of about 1.99, the acid equivalent weight (meq/g) of about 900, and the single-film conductivity, at room temperature, of more than 0.15 S/cm.

Preparation Example 2

To a pre-emulsification reactor A of about 100 liters of internal volume, 39,000 g of purified water and 100 g of ammonium perfluorooctanoate were added at room temperature. As the mixture was being stirred at a high speed, 5,000 g of a fluorine-containing sulfonyl fluoride liquid phase monomer consisting of 80% by weight of $CF_2\!=\!CF\!-\!O\!-\!CF_2CF(CF_3)\!-\!O\!-\!CF_2CF_2\!-\!SO_2F$ and 20% by weight of $CF_2\!=\!CF\!-\!O\!-\!CF_2CF_\lambda\!-\!SO_2F$ were added slowly. Continuing the high-speed shear stirring for about 30 min gave rise to a prepolymer emulsion. Oxygen was removed from another reactor B of about 100 liters of internal volume to such an extent that the oxygen content in the reactor B is less than 20 ppm. Then, all the prepolymer emulsion from the reactor A and a gaseous monomer mixture consisting of 75% by mol of tetrafluoroethylene, 20% by mol of vinylidene fluoride, and 5% by mol of chlorotrifluoroethylene were added to the reactor B. In the reactor B, the temperature was raised to 70° C., and the pressure was maintained at 9 kg. At this time, a solution of 2.5 g of ammonium persulfate in 1 liter of deionized water was added to start free radical polymerization.

The fluorine-containing sulfonyl fluoride liquid phase monomer and the gaseous monomer mixture that actually participated in the radical polymerization were at the ratio about 5:4 by weight, and the radical initiator added to the reactor B and the fluorine-containing sulfonyl fluoride liquid phase monomer were at the ratio of 0.05% by weight.

The temperature of the reaction in the reactor B was controlled at 70° C. to 75° C., and the reaction continued for 1 hr. When the temperature in the reactor B was lowered to room temperature, the stirring was stopped. The resultant was an emulsion of a fluorine- and chlorine-containing conductive polymer of which the primary particles have the average particle diameter of about 120 nm and which has the solid content of about 21%. Hydrolyzing the emulsion with sulfonyl fluoride ($-SO_2F$) resulted in a fluorine- and chlorine-containing sulfonic acid ($-SO_3H$) conductive polymer. After being dried, the conductive polymer has the specific gravity of about 1.91, the acid equivalent weight (meq/g) of about 800, and the single-film conductivity, at room temperature, of more than 0.20 S/cm.

Preparation Example 3

To a pre-emulsification reactor A of about 100 liters of internal volume, 39,000 g of purified water and 100 g of ammonium perfluorooctanoate were added at room temperature. As the mixture was being stirred at a high speed, 3,000 g of a fluorine-containing sulfonyl fluoride liquid phase monomer consisting of 50% by weight of $CF_2$=CF—O—$CF_2CF(CF_3)$—O—$CF_2CF_2$—$SO_2F$ and 50% by weight of $CF_2$=CF—O—$CF_2CF_2$—$SO_2F$ were added slowly. Continuing the high-speed shear stirring for about 30 min gave rise to a prepolymer emulsion. Oxygen was removed from another reactor B of about 100 liters of internal volume to such an extent that the oxygen content in the reactor B is less than 20 ppm. Then, all the prepolymer emulsion from the reactor A and a gaseous monomer mixture consisting of 50% by mol of tetrafluoroethylene and 50% by mol of chlorotrifluoroethylene were added to the reactor B. In the reactor B, the temperature was raised to 70° C., and the pressure was maintained at 14 kg. At this time, a solution of 1.5 g of ammonium persulfate in 1 liter of deionized water was added to start free radical polymerization.

The fluorine-containing sulfonyl fluoride liquid phase monomer and the gaseous monomer mixture that actually participated in the radical polymerization were at the ratio about 1:3 by weight, and the radical initiator added to the reactor B and the fluorine-containing sulfonyl fluoride liquid phase monomer were at the ratio of 0.05% by weight.

The temperature of the reaction in the reactor B was controlled at 70° C. to 75° C., and the reaction continued for 1 hr. When the temperature in the reactor B was lowered to room temperature, the stirring was stopped. The resultant was an emulsion of a fluorine- and chlorine-containing conductive polymer of which the primary particles have the average particle diameter of about 150 nm and which has the solid content of about 22%. Hydrolyzing the emulsion with sulfonyl fluoride (—$SO_2F$) resulted in a fluorine- and chlorine-containing sulfonic acid (—$SO_3H$) conductive polymer. After being dried, the conductive polymer has the specific gravity of about 2.02, the acid equivalent weight (meq/g) of about 1,500, and the single-film conductivity, at room temperature, of more than 0.02 S/cm.

Preparation Example 4

To a pre-emulsification reactor A of about 100 liters of internal volume, 39,000 g of purified water and 300 g of ammonium perfluorooctanoate were added at room temperature. As the mixture was being stirred at a high speed, 6,000 g of a fluorine-containing sulfonyl fluoride liquid phase monomer consisting of 20% by weight of $CF_2$=CF—O—$CF_2CF(CF_3)$—O—$CF_2CF_2$—$SO_2F$ and 80% by weight of $CF_2$=CF—O—$CF_2CF_2$—$SO_2F$ were added slowly. Continuing the high-speed shear stirring for about 30 min gave rise to a prepolymer emulsion. Oxygen was removed from another reactor B of about 100 liters of internal volume to such an extent that the oxygen content in the reactor B is less than 20 ppm. Then, all the prepolymer emulsion from the reactor A and a gaseous monomer mixture consisting of 70% by mol of tetrafluoroethylene and 30% by mol of chlorotrifluoroethylene were added to the reactor B. In the reactor B, the temperature was raised to 70° C., and the pressure was maintained at 10 kg. At this time, a solution of 3 g of ammonium persulfate in 1 liter of deionized water was added to start free radical polymerization.

The fluorine-containing sulfonyl fluoride liquid phase monomer and the gaseous monomer mixture that actually participated in the radical polymerization were at the ratio about 3:1 by weight, and the radical initiator added to the reactor B and the fluorine-containing sulfonyl fluoride liquid phase monomer were at the ratio of 0.05% by weight.

The temperature of the reaction in the reactor B was controlled at 70° C. to 75° C., and the reaction continued for 1 hr. When the temperature in the reactor B was lowered to room temperature, the stirring was stopped. The resultant was an emulsion of a fluorine- and chlorine-containing conductive polymer of which the primary particles have the average particle diameter of about 70 nm and which has the solid content of about 19.5%. Hydrolyzing the emulsion with sulfonyl fluoride (—$SO_2F$) resulted in a fluorine- and chlorine-containing sulfonic acid (—$SO_3H$) conductive polymer. After being dried, the conductive polymer has the specific gravity of about 1.97, the acid equivalent weight (meq/g) of about 500, and the single-film conductivity, at room temperature, of more than 0.35 S/cm.

Preparation Example 5

To a pre-emulsification reactor A of about 100 liters of internal volume, 39,000 g of purified water and 300 g of ammonium perfluorooctanoate were added at room temperature. As the mixture was being stirred at a high speed, 3,000 g of a fluorine-containing sulfonyl fluoride liquid phase monomer consisting of 60% by weight of $CF_2$=CF—$CF_2$—O—$SO_2F$ and 40% by weight of $CF_2$=CF—O—$CF_2CF_2$—$SO_2F$ were added slowly. Continuing the high-speed shear stirring for about 30 min gave rise to a prepolymer emulsion. Oxygen was removed from another reactor B of about 100 liters of internal volume to such an extent that the oxygen content in the reactor B is less than 20 ppm. Then, all the prepolymer emulsion from the reactor A and a gaseous monomer mixture consisting of 25% by mol of tetrafluoroethylene, 70% by mol of vinylidene fluoride, and 5%, by mol of chlorotrifluoroethylene were added to the reactor B. In the reactor B, the temperature was raised to 80° C., and the pressure was maintained at 17 kg. At this time, a solution of 1.5 g of ammonium persulfate in 1 liter of deionized water was added to start free radical polymerization.

The fluorine-containing sulfonyl fluoride liquid phase monomer and the gaseous monomer mixture that actually participated in the radical polymerization were at the ratio about 1:2.5 by weight, and the radical initiator added to the reactor B and the fluorine-containing sulfonyl fluoride liquid phase monomer were at the ratio of 0.05% by weight.

The temperature of the reaction in the reactor B was controlled at 80° C. to 85° C., and the reaction continued for 45 min. When the temperature in the reactor B was lowered to room temperature, the stirring was stopped. The resultant was an emulsion of a fluorine- and chlorine-containing conductive polymer of which the primary particles have the average particle diameter of about 50 nm and which has the solid content of about 20%. Hydrolyzing the emulsion with sulfonyl fluoride (—$SO_2F$)/(—$CF_2$—O—$SO_2F$) resulted in a fluorine- and chlorine-containing sulfonic acid (—$SO_3H$)/carboxylic acid (—COOH) conductive polymer. After being dried, the conductive polymer has the specific gravity of about 1.72, the acid equivalent weight (meq/g) of about 950, and the single-film conductivity, at room temperature, of more than 0.10 S/cm.

(2) PREPARATION OF MICROPOROUS FILM SKELETON

Preparation Example 6

The fluorine- and chlorine-containing conductive polymer resin obtained in preparation example 3 and dimethylacetamide were mixed at the weight ratio of about 1:4, and stirred as the temperature was being raised. After the resin was dissolved, the solution was subjected to electrospinning, with the yield of about 5 grams per minute. The nanofiber filaments were collected on release paper with the release paper moving at the speed of 0.1 in/min. A film of nanofiber filaments having the width of about 1 m was obtained. The film was gradually dried with a hot air at the temperature of about 90° C., and finally gave rise to a film of nanofiber filaments having the thickness of about 20 µm and the width of about 100 cm. The average diameter of the filaments was about 170 nm. The film weighed about 10 g/m$^2$, and had the porosity of about 78-82% and the specific gravity of 0.39. As for its gas permeability, measured using the Gurley method, it took about 7-12 seconds for 100 ml of air to pass through.

Preparation Example 7

Polyacrylonitrile (PAN) resin (a copolymerized polyacrylonitrile resin produced by copolymerizing acrylonitrile and a small amount of methyl acrylate and methylene succinic ester, with a molecular weight ranging from 60,000 to 80,000) and dimethyl sulfoxide were mixed at the weight ratio of about 1:4, and stirred as the temperature was being raised. After the resin was dissolved, the solution was subjected to ultra-high speed centrifugal spinning, with the yield of about 20 grams per minute. The nanofiber filaments were collected on release paper with the release paper moving at the speed of 0.1 m/min. A film of nanofiber filaments having the width of about 1 m was obtained. The film was gradually dried with a hot air at the temperature of about 160° C., and finally gave rise to a film of nanofiber filaments having the thickness of about 70 µm and the width of about 100 cm. The average diameter of the filaments was about 350 nm. The film weighed about 39 g/m$^2$, and had the porosity of about 82%-86% and the specific gravity of 0.28. As for its gas permeability, measured using the Gurley method, it took about 13-17 seconds for 100 ml of air to pass through.

Preparation Example 8

The polyacrylonitrile film obtained in preparation example 7 was heated in air to about 270° C. and kept at that temperature for 2 hr. During that time, the polyacrylonitrile film gradually turned from white to yellow, to brown, and finally became a black preoxidization microporous film, which was a result of a series of chemical reactions that the polyacrylonitrile linear polymer underwent, such as oxidation, pyrolysis, crosslinking, and cyclization. The porous film was then carbonized by being heated in nitrogen at 1,600° C. That high temperature processing let the nanofibers to undergo crosslinking, cyclization, aromatization and polycondensation and removed hydrogen, nitrogen and oxygen atoms, and finally led to a PAN-based carbon fiber film which is a two-dimensional carbon ring planar network with roughly parallel layers of graphite-like structure. The carbon fiber film had the thickness of about 15 µm and the width of about 100 cm. The average diameter of the fibers was about 160 nm. The film weighed about 7 g/m$^2$, and had the porosity of about 89%-93% and the specific gravity of 0.27. As for its gas permeability, measured using the Gurley method, it took about 7-9 seconds for 100 ml of air to pass through.

Preparation Example 9

ECTFE resin (a copolymer of ethylene and chlorotrifluoroethylene, from Solvay) was subjected to melt spinning, with the yield of about 20 grams per minute. The nanofiber filaments were collected on release paper with the release paper moving at the speed of 1 m/min. A film of nanofiber filaments having the width of about 1 m was obtained. The finally obtained film of nanofiber filaments had the thickness of about 45 µm and the width of about 100 cm. The average diameter of the filaments was about 450 nm. The film weighed about 20 g/m$^2$, and had the porosity of about 78%-80% and the specific gravity of 0.42. As for its gas permeability, measured using the Gurley method, it took about 12-15 seconds for 100 ml of air to pass through.

Preparation Example 10

PET polyester resin and ethylene carbonate were mixed at the weight ratio of about 1:4, and stirred as the temperature was being raised. After the resin is dissolved, the solution was thoroughly applied on release paper while it has a temperature slightly exceeding 200° C. The formed PET film was rapidly cooled to room temperature, and the release paper was peeled off. The film was gradually dried with a hot air at the temperature of about 170° C., and finally gave rise to a microporous film having the thickness of about 50 µm and the width of about 160 cm. The film weighed about 15 g/m$^2$, and had the porosity of about 68-72% and the specific gravity of 0.29. As for its gas permeability, measured using the Gurley method, it took about 17-23 seconds for 100 ml of air to pass through.

(3) PREPARATION OF FLUORINE- AND CHLORINE-CONTAINING CONDUCTIVE POLYMER SINGLE-SIDE FILLED COMPOSITE FILM

Example 1

The fluorine- and chlorine-containing conductive polymer (with the acid equivalent weight of 950) obtained in preparation example 5 was dissolved in a solution of dimethylformamide/ethanol (1:1) such that the concentration of the conductive polymer in the solution was about 20%. Then, activated carbon powder weighing about 5% of the weight of the solution was added to the solution. One side of the ECTFE microporous film skeleton obtained in preparation example 9 was immersed in the solution at room temperature for about 1 min. The film was taken out and had the extra liquid on the surface scraped off. The film was slowly dried at 90° C. to give a composite film. The composite film was transparent, had the thickness of about 47 µm and the width of about 100 cm, weighed about 39 g/m$^2$, and had the filled polymer in the amount of 19 g/m$^2$. As for its gas permeability, measured using the Gurley method, it took more than 3 min for 100 ml of air to pass through.

This composite film had the tensile strength of more than 50 MPa, superior in mechanical strength to a film prepared using only the fluorine- and chlorine-containing conductive polymer (with the acid equivalent weight of 950) obtained in preparation example 5, which had the tensile strength of less than 20 MPa.

This composite film and the nylon 6 plain weave fabric (90 g/m$^2$) were bonded via a polyurethane glue to form a composite fabric. The composite fabric had a water pressure resistance that was initially greater than 200 kPa, and was still greater than 100 kPa after being washed 10 times, and had the moisture vapor transmission rate of more than 4,000 g/m$^2$/day. It allowed chloroethyl ether (ClCH$_2$CH$_2$OCH$_2$CH$_2$Cl) to pass through at a rate less than 4 μg/cm$^2$/day, which was the evidence that the composite film was excellent in impermeability to toxic and harmful chemicals.

Example 2

The fluorine- and chlorine-containing conductive polymer (with the acid equivalent weight of 950) obtained in preparation example 5 was dissolved in a solution of dimethylformamide/ethanol (1:1) such that the concentration of the conductive polymer in the solution was about 20%. One side of the PET polyester microporous film skeleton obtained in preparation example 10 was immersed in the solution of the fluorine- and chlorine-containing conductive polymer (with the acid equivalent weight of 950) at room temperature for about 1 min. The film was taken out and had the extra liquid on the surface scraped off. The film was slowly dried at 90° C. to give a composite film. The composite film was transparent, had the thickness of about 53 μm and the width of about 100 cm, weighed about 33 g/m$^2$, and had the filled polymer in the amount of 18 g/m$^2$. As for its gas permeability, measured using the Gurley method, it took more than 3 min for 100 ml of air to pass through. This composite film had the tensile strength of more than 30 MPa, superior in mechanical strength to a film prepared using only the fluorine- and chlorine-containing conductive polymer (with the acid equivalent weight of 950) obtained in preparation example 5, which had the tensile strength of less than 20 MPa.

This composite film and the nylon 6 plain weave fabric (90 g/m$^2$) were bonded via a polyurethane glue to form a composite fabric. The composite fabric had a water pressure resistance that was initially greater than 200 kPa, and was still greater than 100 kPa after being washed 10 times, and had the moisture vapor transmission rate of more than 4,000 g/m$^2$/day. It allowed chloroethyl ether (ClCH$_2$CH$_2$OCH$_2$CH$_2$Cl) to pass through at a rate less than 4 μg/cm$^2$/day, which was the evidence that the composite film was excellent in impermeability to toxic and harmful chemicals.

(4) PREPARATION OF FLUORINE- AND CHLORINE-CONTAINING CONDUCTIVE POLYMER TWO-SIDE FILLED COMPOSITE FILM

Example 3

The fluorine- and chlorine-containing conductive polymer (with the acid equivalent weight of 900) obtained in preparation example 1 was dissolved in a solution of dimethylformamide/ethanol (1:1) such that the concentration of the conductive polymer in the solution was about 20%. The two sides of the fluorine- and chlorine-containing conductive polymer (with the acid equivalent weight of 1500) microporous film skeleton obtained in preparation example 6 were immersed in the above solution of the fluorine- and chlorine-containing conductive polymer (with the acid equivalent weight of 900) at room temperature for about 1 min. The film was taken out and had the extra liquid on the surface scraped off. The film was slowly dried at 90° C. to give a composite film. The composite film was transparent, had the thickness of about 25 nm, the width of about 100 cm, the specific gravity of 1.81 and the conductivity of about 0.11 S/cm, weighed about 45 g/m$^2$, and had the filled polymer in the amount of 35 g/m$^2$ As for its gas permeability, measured using the Gurley method, it took more than 3 min for 100 ml of air to pass through. This composite film had the tensile strength of more than 30 MPa, superior in mechanical strength to a film prepared using only the fluorine- and chlorine-containing conductive polymer (with the acid equivalent weight of 900) obtained in preparation example 1, which had the tensile strength of less than 20 MPa. This composite film is useful in fuel cells.

Example 4

The fluorine- and chlorine-containing conductive polymer obtained in preparation example 4 was dissolved in a solution of dimethylformamide/ethanol (1:1) such that the concentration of the conductive polymer in the solution was about 20%. Then, graphite powder weighing about 5% of the weight of the above solution and 1 ppm platinum nanoparticles were added to the solution. The two sides of the fluorine- and chlorine-containing conductive polymer (with the acid equivalent weight of 1500) microporous film skeleton obtained in preparation example 6 were immersed in the solution at room temperature for about 1 min. The film was taken out and had the extra liquid on the surface scraped off. The film was slowly dried at 90° C. to give a composite film. The composite film was transparent, had the thickness of about 25 μm, the width of about 100 cm, the specific gravity of 1.83 and the conductivity of about 0.23 S/cm, weighed about 47 g/m$^2$, and had the filled polymer in the amount of 37 g/m$^2$. As for its gas permeability, measured using the Gurley method, it took more than 3 min for 100 ml of air to pass through. This composite film had the tensile strength of more than 30 MPa, superior in mechanical strength to a film prepared using only the fluorine- and chlorine-containing conductive polymer (with the acid equivalent weight of 500) obtained in preparation example 4, which had the tensile strength of less than 10 MPa and almost did not have strength. This composite film is useful in fuel cells.

Example 5

The fluorine- and chlorine-containing conductive polymer (with the acid equivalent weight of 900) obtained in preparation example 1 was dissolved in a solution of dimethylformamide/ethanol (1:1) such that the concentration of the conductive polymer in the solution was about 20%. Then, 10 ppm graphene was added to the solution. The two sides of the carbon fiber microporous film skeleton obtained in preparation example 8 were immersed in the solution at room temperature for about 1 min. The film was taken out and had the extra liquid on the surface scraped off. The film was slowly dried at 90° C. to give a composite film. The composite film was transparent, had the thickness of about 19 μm, the width of about 100 cm, the specific gravity of 1.93 and the conductivity of about 0.19 S/cm, weighed about 37 g/m$^2$, and had the filled polymer in the amount of 12 g/m$^2$. As for its gas permeability, measured using the Gurley method, it took more than 3 min for 100 ml of air to pass through. This composite film had the tensile strength of more than 60 MPa, superior in mechanical strength to a film prepared using only the fluorine- and chlorine-containing conductive polymer (with the acid equivalent weight of 900) obtained in preparation example 1, which had the tensile strength of less than 20 MPa. This composite film is useful in fuel cells.

Example 6

The fluorine- and chlorine-containing conductive polymer (with the acid equivalent weight of 500) obtained in preparation example 4 was dissolved in a solution of dimethylformamide/ethanol (1:1) such that the concentration of the conductive polymer in the solution was about 20%. The two sides of the ECTFE microporous film skeleton obtained in preparation example 9 were immersed in the solution of the fluorine- and chlorine-containing conductive polymer (with the acid equivalent weight of 500) at room temperature for about 1 min. The film was taken out and had the extra liquid on the surface scraped off. The film was slowly dried at 90° C. to give a composite film. The composite film was transparent, had the thickness of about 50 μm, the width of about 100 cm, the specific gravity of 1.96 and the conductivity of about 0.17 S/cm, weighed about 98 $g/m^2$, and had the filled polymer in the amount of 78 $g/m^2$. As for its gas permeability, measured using the Gurley method, it took more than 3 min for 100 ml of air to pass through. This composite film had the tensile strength of more than 50 MPa, superior in mechanical strength to a film prepared using only the fluorine- and chlorine-containing conductive polymer (with the acid equivalent weight of 500) obtained in preparation example 4, which had the tensile strength of less than 10 MPa and almost did not have strength. This composite film is useful in fuel cells.

Example 7

The fluorine- and chlorine-containing conductive polymer (with the acid equivalent weight of 950) obtained in preparation example 5 was dissolved in a solution of dimethylformamide/ethanol (1:1) such that the concentration of the conductive polymer in the solution was about 20%. The two sides of the carbon fiber microporous film skeleton obtained in preparation example 8 were immersed in the solution of the fluorine- and chlorine-containing conductive polymer (with the acid equivalent weight of 950) at room temperature for about 1 min. The film was taken out and had the extra liquid on the surface scraped off. The film was slowly dried at 90° C. to give a composite film. The composite film was transparent, had the thickness of about 21 μm, the width of about 100 cm, the specific gravity of 1.86 and the conductivity of about 0.13 S/cm, weighed about 39 $g/m^2$, and had the filled polymer in the amount of 32 $g/m^2$. As for its gas permeability, measured using the Gurley method, it took more than 3 min for 100 ml of air to pass through. This composite film had the tensile strength of more than 1,000 MPa, superior in mechanical strength to a film prepared using only the fluorine- and chlorine-containing conductive polymer (with the acid equivalent weight of 950) obtained in preparation example 5.

This composite film and the nylon 6 plain weave fabric (90 $g/m^2$) were bonded via a polyurethane glue to form a composite fabric. The composite fabric had a water pressure resistance that was initially greater than 200 kPa, and was still greater than 100 kPa after being washed 10 times, and had the moisture vapor transmission rate of more than 4,000 $g/m^2$/day. It allowed chloroethyl ether ($ClCH_2CH_2OCH_2CH_2Cl$) to pass through at a rate less than 4 $\mu g/cm^2$/day, which was the evidence that the composite film was excellent in impermeability to toxic and harmful chemicals.

(5) COMPARATIVE EXAMPLES

Comparative Example 1

A DuPont's perfluoroconductive polymer film (Nafion NR-211, with the film thickness of 25 μm) and the nylon 6 plain weave fabric (90 $g/m^2$) were bonded via a polyurethane glue to form a composite fabric. The composite fabric had a water pressure resistance that was initially greater than 200 kPa, but could not resist water pressure after being washed 10 times because the film was detached from the fabric, and had the moisture vapor transmission rate of more than 4,000 $g/m^2$/day. It allowed chloroethyl ether ($ClCH_2CH_2OCH_2CH_2Cl$) to pass through at a rate greater than 60 $\mu g/cm^2$/day, which was the evidence that the composite film was poor in impermeability to toxic and harmful chemicals.

Comparative Example 2

A DuPont's perfluoro-conductive polymer film (Nafion NR-212, with the film thickness of 50 μm) and the nylon 6 plain weave fabric (90 $g/m^2$) were bonded via a polyurethane glue to form a composite fabric. The composite fabric had a water pressure resistance that was initially greater than 200 kPa, but could not resist water pressure after being washed 10 times because the film was detached from the fabric, and had the moisture vapor transmission rate of more than 4,000 $g/m^2$/day. It allowed chloroethyl ether ($ClCH_2CH_2OCH_2CH_2Cl$) to pass through at a rate greater than 40 $\mu g/cm^2$/day, which was the evidence that the composite film was poor in impermeability to toxic and harmful chemicals.

Comparative Example 3

The DuPont Nafion D520 perfluorosulfonic acid resin solution was concentrated under vacuum until the concentration of the perfluorosulfonic acid conductive polymer Nafion in the solution was about 20%. The two sides of an expanded polytetrafluoroethylene film purchased online (which acted as the microporous film skeleton) were immersed in the concentrated solution at room temperature for about 1 min. The film was taken out and had the extra liquid on the surface scraped off. The film was slowly dried at 90° C. to give a composite film. The composite film was transparent, had the thickness of about 25 μm, the width of about 100 cm, the specific gravity of 1.98 and the conductivity of about 0.08 S/cm, and weighed about 50 $g/m^2$. As for its gas permeability, measured using the Gurley method, it took more than 3 min for 100 ml of air to pass through. Since the conductivity of the composite film was less than 0.1 S/cm, it cannot be used as a fuel cell membrane.

Comparative Example 4

The DuPont Nafion D520 perfluorosulfonic acid resin solution was concentrated under vacuum until the concentration of the perfluorosulfonic acid conductive polymer Nafion in the solution was about 20%. The two sides of the carbon fiber microporous film skeleton obtained in preparation example 8 were immersed in the concentrated solution at room temperature for about 1 min. The film was taken out and had the extra liquid on the surface scraped off. The film was slowly dried at 90° C. to give a composite film. The composite film was transparent, had the thickness of about 21 µm, the width of about 100 cm, the specific gravity of 1.89 and the conductivity of about 0.09 S/cm, and weighed about 40 g/m$^2$. As for its gas permeability, measured using the Gurley method, it took more than 3 min for 100 ml of air to pass through.

This composite film and the nylon 6 plain weave fabric (90 g/m$^2$) were bonded via a polyurethane glue to form a composite fabric. The composite fabric had a water pressure resistance that was initially greater than 200 kPa, but could not resist water pressure after being washed 10 times because the film was detached from the fabric, and had the moisture vapor transmission rate of more than 4,000 g/m$^2$/day. It allowed chloroethyl ether (ClCH$_2$CH$_2$OCH$_2$CH$_2$Cl) to pass through at a rate greater than 40 µg/cm$^2$/day, which was the evidence that the composite film was poor in impermeability to toxic and harmful chemicals.

The above examples and comparative examples show that the perfluoro-conductive polymer films were inferior to the fluorine- and chlorine-containing conductive polymer films in impermeability to toxic and harmful chemicals. The fluorine- and chlorine-containing conductive polymer one-side or two-side filled composite films were superior to the films prepared using only the fluorine- and chlorine-containing conductive polymer in mechanical strength, gas permeability and conductivity. The composite fabrics made from the composite films were excellent in washability, moisture vapor transmission rate, and imperviousness to poisonous and harmful chemicals. The fluorine- and chlorine-containing conductive polymer two-side filled composite films performed better than the perfluoro-conductive polymer two-side filled composite films.

The above embodiments of the present disclosure are merely illustrative of the present disclosure and are not intended to limit how to implement the present disclosure. Other variations or modifications can be made by those skilled in the art on the basis of the above description. It is unnecessary and impossible to exhaust herein all embodiments of the present disclosure. Any modification, replacement and improvement that does not depart from the spirit and scope of the present disclosure is covered by the scope of the claims.

What is claimed is:

1. A method for preparing a fluorine- and chlorine-containing conductive polymer resin, comprising:
    adding, to a reaction vessel, 1%-20% by weight of a fluorine-containing sulfonyl fluoride liquid phase monomer which is capable of free radical polymerization, 79%-98% by weight of purified water, and 0.01%-1% by weight of a fluorine-containing surfactant, and stirring the mixture at a high speed to give a prepolymer emulsion;
    introducing, into the reaction vessel, a gaseous monomer mixture of (i) one or both of tetrafluoroethylene and vinylidene fluoride and (ii) chlorotrifluoroethylene under a reaction pressure of 5 kg/cm$^2$ or more, introducing a radical initiator, and allowing the reaction to proceed at a temperature of 20-120° C., under a reaction pressure of 5-25 kg/cm$^2$, for 15-180 min to give the reaction product which is an emulsion of a fluorine- and chlorine-containing sulfonyl fluoride polymer, wherein the fluorine-containing sulfonyl fluoride liquid phase monomer and the gaseous monomer mixture that participate in the radical polymerization are at a ratio ranging from 1:3 to 3:1 by weight, and the radical initiator added to the reaction vessel and the fluorine-containing sulfonyl fluoride liquid phase monomer are at a ratio ranging from 0.01% to 3.0% by weight; and
    hydrolyzing the emulsion of the fluorine- and chlorine-containing sulfonyl fluoride polymer, and then condensing, washing and drying the hydrolysate to give a fluorine- and chlorine-containing conductive polymer resin.

2. The method according to claim 1, wherein the fluorine-containing sulfonyl fluoride liquid phase monomer includes one or more of CF$_2$=CF—O—R$_f$—SO$_2$F, CF$_2$=CF—O—R$_{f1}$—O—R$_{f2}$—SO$_2$F and CF$_2$=CF—CF$_2$—O—R$_{f3}$—SO$_2$F, wherein R$_f$, R$_{f1}$, and R$_{f2}$ are fluorine-containing alkyl groups having 1 to 6 carbon atoms, and R$_{f3}$ is a fluorine-containing alkyl group having 0 to 5 carbon atoms.

3. The method according to claim 1, wherein when the fluorine- and chlorine-containing conductive polymer resin applies to batteries, the fluorine-containing sulfonyl fluoride liquid phase monomer consists of 0%-80% by weight of CF$_2$=CF—O—CF$_2$CF$_2$—SO$_2$F, 20%-99% by weight of CF$_2$=CF—O—CF$_2$CF(CF$_3$)—O—CF$_2$CF$_2$—SO$_2$F, 0%-20% by weight of CF$_2$=CF—CF$_2$—O—SO$_2$F, and 0%-80% by weight of CF$_2$=CF—CF$_2$—O—CF$_2$CF$_2$—SO$_2$F.

4. The method according to claim 1, wherein when the fluorine- and chlorine-containing conductive polymer resin applies to nuclear and biochemical protective films, the fluorine-containing sulfonyl fluoride liquid phase monomer consists of 0%-80% by weight of CF$_2$=CF—O—CF$_2$CF$_2$—SO$_2$F, 0%-20% by weight of CF$_2$=CF—O—CF$_2$CF(CF$_3$)—O—CF$_2$CF$_2$—SO$_2$F, 20%-100% by weight of CF$_2$=CF—CF$_2$—O—SO$_2$F, and 0%-80% by weight of CF$_2$=CF—CF$_2$—O—CF$_2$CF$_2$—SO$_2$F.

5. The method according to claim 1, wherein the fluorine-containing sulfonyl fluoride liquid phase monomer contains a fluorine-containing sulfonyl fluoride-free reagent, the ratio of the weight of which to the weight of the fluorine-containing sulfonyl fluoride monomer is less than or equal to 30%.

6. The method according to claim 5, wherein the fluorine-containing sulfonyl fluoride-free reagent includes one or more of a fluorine-containing alkyl group, a fluorine-containing alkyl ether, perfluoromethyl vinyl ether, perfluoroethyl vinyl ether, perfluoropropyl vinyl ether, 3,3,3-trifluoropropene, and perfluoroalkylethylene.

7. The method according to claim 1, wherein the gaseous monomer mixture comprises 25%-90% by mol of tetrafluoroethylene, 0%-70% by mol of vinylidene fluoride, and 5%-50% by mol of chlorotrifluoroethylene.

8. A fluorine- and chlorine-containing conductive polymer single-side filled composite film, comprising a microporous film skeleton and the fluorine- and a chlorine-containing conductive polymer resin prepared using the method according to claim 1, wherein more than 85% by volume of the pores in a single side of the microporous film skeleton are filled with the fluorine- and chlorine-containing conductive polymer resin.

9. A method for preparing the fluorine- and chlorine-containing conductive polymer single-side filled composite film according to claim 8, comprising:
    filling the pores in a single side of the microporous film skeleton with the fluorine- and chlorine-containing conductive polymer resin in a coating or immersing way to give a composite material; and drying the composite material.

10. The method according to claim 9, wherein the ratio of the weight of the microporous film skeleton to the weight of the fluorine- and chlorine-containing conductive polymer resin ranges from 25:75 to 75:25.

11. The method according to claim 9, wherein the microporous film skeleton is prepared by
subjecting, to melt spinning or wet spinning, one of a hot meltable fluorine-containing, or fluorine- and chlorine-containing resin, a fluorine- and chlorine-containing conductive polymer resin, a carbon fiber precursor, polyimide, polyamide, polyester, aramid, and polyetherketone, collecting an irregular net of microporous structures, and subjecting the net to heat setting.

12. The method according to claim 9, wherein the pores in a single side of the microporous film skeleton are filled with the fluorine- and chlorine-containing conductive polymer resin and one or more of activated charcoal powder, graphite powder, graphene, and rare metal powder.

13. The method according to claim 9, wherein the weight of one or more of activated charcoal powder, graphite powder, graphene, and rare metal powder does not exceed 25% of the weight of the fluorine- and chlorine-containing conductive polymer resin.

14. The method according to claim 9, wherein an sulfonic acid or carboxylic acid equivalent weight (meq/g) of the fluorine- and chlorine-containing conductive polymer resin ranges from 400 to 1,600.

15. A fluorine- and chlorine-containing conductive polymer double-side filled composite film, comprising a microporous film skeleton and a fluorine- and chlorine-containing conductive polymer resin prepared using the method according to claim 1, wherein more than 60% by volume of the pores in two sides of the microporous film skeleton are filled with the fluorine- and chlorine-containing conductive polymer resin.

16. A method for preparing the fluorine- and chlorine-containing conductive polymer double-side filled composite film according to claim 15, comprising:
filling the pores in two sides of the microporous film skeleton with the fluorine- and chlorine-containing conductive polymer resin in a coating or immersing way to give a composite material, and drying the composite material.

17. The method according to claim 16, wherein the ratio of the weight of the microporous film skeleton to the weight of the fluorine- and chlorine-containing conductive polymer resin ranges from 5:95 to 40:60.

18. The method according to claim 16, wherein the microporous film skeleton is prepared by
subjecting, to melt spinning or wet spinning, one of a hot meltable fluorine-containing, or fluorine- and chlorine-containing resin, a fluorine- and chlorine-containing conductive polymer resin, a carbon fiber precursor, polyimide, polyamide, polyester, aramid, and polyetherketone, collecting an irregular net of microporous structures, and subjecting the net to heat setting.

19. The method according to claim 18, wherein the hot meltable fluorine-containing, or fluorine- and chlorine-containing resin includes one or more of hot meltable polytetrafluoroethylene copolymer, polychlorotrifluoroethylene or copolymer thereof, and polyvinylidene fluoride or copolymer thereof.

20. The method according to claim 18, wherein an acid equivalent weight (meq/g) of the fluorine- and chlorine-containing conductive polymer resin ranges from 400 to 1,500.

21. The method according to claim 16, wherein the pores in two sides of the microporous film skeleton are filled with the fluorine- and chlorine-containing conductive polymer resin and one or more of activated charcoal powder, graphite powder, graphene, and rare metal powder.

22. The method according to claim 16, wherein the weight of one or more of activated charcoal powder, graphite powder, graphene, and rare metal powder does not exceed 25% of the weight of the fluorine- and chlorine-containing conductive polymer resin.

23. The method according to claim 1, wherein the fluorine-containing sulfonyl fluoride liquid phase monomer includes one or more of $CF_2=CF-O-CF_2CF_2-SO_2F$, $CF_2=CF-O-CF_2CF(CF_3)-O-CF_2CF_2-SO_2F$, $CF_2=CF-CF_2-O-SO_2F$ and $CF_2=CF-CF_2-O-CF_2CF_2-SO_2F$.

* * * * *